(12) United States Patent
Sugimoto et al.

(10) Patent No.: US 9,771,128 B2
(45) Date of Patent: Sep. 26, 2017

(54) BICYCLE CRANK ASSEMBLY

(75) Inventors: Akinobu Sugimoto, Osaka (JP); Eigo Kuroiwa, Osaka (JP); Toshio Tetsuka, Hyogo (JP); Yusuke Nishimoto, Osaka (JP)

(73) Assignee: Shimano Inc., Osaka (JP)

( * ) Notice: Subject to any disclaimer, the term of this patent is extended or adjusted under 35 U.S.C. 154(b) by 838 days.

(21) Appl. No.: 13/253,113

(22) Filed: Oct. 5, 2011

(65) Prior Publication Data

US 2013/0087012 A1 Apr. 11, 2013

(51) Int. Cl.
*B62M 3/00* (2006.01)
*B62M 9/10* (2006.01)

(52) U.S. Cl.
CPC ............. *B62M 9/105* (2013.01); *B62M 3/00* (2013.01); *Y10T 74/2165* (2015.01)

(58) Field of Classification Search
USPC .............................................. 74/594.1, 594.2
See application file for complete search history.

(56) References Cited

U.S. PATENT DOCUMENTS

| | | | | |
|---|---|---|---|---|
| 5,273,495 | A * | 12/1993 | Nagano | 474/144 |
| 5,480,359 | A * | 1/1996 | Tani | 474/160 |
| 5,560,266 | A * | 10/1996 | Shikimori et al. | 74/594.1 |
| 5,766,106 | A * | 6/1998 | Edwards | 474/160 |
| 5,791,203 | A * | 8/1998 | Chen et al. | 74/594.2 |
| 5,946,982 | A * | 9/1999 | Schmidt | 74/594.2 |
| 5,988,016 | A * | 11/1999 | Yamanaka | 74/594.2 |
| 6,353,992 | B1 * | 3/2002 | Mizobe | 29/527.5 |
| 7,152,501 | B2 * | 12/2006 | Yamanaka et al. | 74/594.1 |
| 7,240,586 | B2 * | 7/2007 | Wu | 74/594.1 |
| 7,258,041 | B2 | 8/2007 | Yamanaka et al. | |
| 7,503,239 | B2 * | 3/2009 | Yamanaka | 74/594.1 |
| 7,650,818 | B2 * | 1/2010 | Inoue et al. | 74/594.1 |
| 7,686,721 | B2 * | 3/2010 | Tabe et al. | 474/152 |
| 7,824,287 | B2 * | 11/2010 | Nonoshita et al. | 474/161 |
| 7,850,564 | B2 * | 12/2010 | Nonoshita | 474/161 |

(Continued)

FOREIGN PATENT DOCUMENTS

| | | |
|---|---|---|
| EP | 0417696 A1 | 9/1990 |
| JP | 59-6186 A | 1/1984 |
| TW | 201024170 A1 | 7/2010 |

OTHER PUBLICATIONS

European Search Report of corresponding EP Application No. 12 17 8460.7 dated Jan. 28, 2013.

*Primary Examiner* — Richard W L Ridley
*Assistant Examiner* — Brian McGovern
(74) *Attorney, Agent, or Firm* — Global IP Counselors, LLP

(57) ABSTRACT

A bicycle crank assembly is provided with a first sprocket, a second sprocket, a crank arm, a sprocket fixing structure and an alignment tube. The first sprocket includes a plurality of first teeth and at least one first mounting portion having a first mounting opening. The second sprocket includes a plurality of second teeth and at least one second mounting portion having a second mounting opening. The crank arm includes at least one sprocket attachment portion having a third mounting opening. The sprocket fixing structure secures the first and second sprockets to the crank arm via the first, second and third mounting openings. The alignment tube extends through at least two of the first, second and third mounting openings.

14 Claims, 11 Drawing Sheets

(56) References Cited

U.S. PATENT DOCUMENTS

| | | | |
|---|---|---|---|
| 7,861,599 B2* | 1/2011 | Meggiolan | 73/794 |
| 7,975,561 B1* | 7/2011 | Ambrosina et al. | 73/862.338 |
| 8,079,288 B2* | 12/2011 | Nakatani et al. | 74/594.2 |
| 2003/0051573 A1* | 3/2003 | Ording et al. | 74/594.1 |
| 2005/0282672 A1* | 12/2005 | Nonoshita | 474/161 |
| 2008/0161145 A1 | 7/2008 | Shiraishi et al. | |
| 2008/0245180 A1* | 10/2008 | Huang | 74/594.1 |
| 2010/0050810 A1* | 3/2010 | Nakatani et al. | 74/594.2 |
| 2012/0042746 A1* | 2/2012 | Nonoshita et al. | 74/594.2 |

* cited by examiner

BICYCLE CRANK ASSEMBLY

BACKGROUND

Field of the Invention

This invention generally relates to a bicycle crank assembly. More specifically, the present invention relates to a bicycle crank assembly having an attachment structure for attaching a pair of sprockets to a crank arm.

Background Information

Generally speaking, a conventional bicycle has a diamond-shaped bicycle frame with a pair of wheels rotatably mounted to the frame and a drive train coupled to the frame for driving the rear wheel. The drive train typically has a bicycle crank assembly mounted to the cylindrical or tubular hanger part of the bicycle frame. The bicycle crank assembly drives a chain that rotates a sprocket mounted to the rear wheel. The bicycle crank assembly usually includes a crank axle that is mounted in a freely rotatable-manner to a hanger tube of the bicycle frame. A crank arm is fastened to each end of the crank axle. The right crank arm typically has one or more sprockets attached thereto for driving the chain. As used herein, the terms "right" and "left" are often used to describe bicycle components on the assumption that the bicycle is viewed from the rear. The sprockets are sometimes attached the right crank arm by a plurality of fixing bolts and a plurality of fixing nuts as shown in U.S. Pat. No. 7,258,041 (assigned to Shimano Inc.). In this conventional bicycle crank assembly, the sprockets are, in an assembled state, directly disposed on a fixing bolt or a fixing nut which is detachable from the sprockets and the right crank arm. The center axes of the fixing bolts can easily become inclined with respect to the center axes of the fixing nuts during attachment of the sprockets to the crank arm, as a result it can be difficult and/or time consuming to accurately position sprockets on the crank arm.

SUMMARY

One aspect presented in this disclosure is to provide a bicycle crank assembly that improves positioning accuracy between two sprockets mounted to a crank arm during assembly.

In view of the state of the known technology, a bicycle crank assembly is presented in this disclosure that comprises a first sprocket, a second sprocket, a crank arm, a sprocket fixing structure and an alignment tube. The first sprocket includes a plurality of first teeth and at least one first mounting portion having a first mounting opening. The second sprocket includes a plurality of second teeth and at least one second mounting portion having a second mounting opening. The crank arm includes at least one sprocket attachment portion having a third mounting opening. The sprocket fixing structure secures the first and second sprockets to the crank arm via the first, second and third mounting openings. The alignment tube extends through at least two of the first, second and third mounting openings.

These and other objects, features, aspects and advantages of the bicycle crank assembly presented in this disclosure will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure.

DETAILED DESCRIPTION OF EMBODIMENTS

Figure 1:
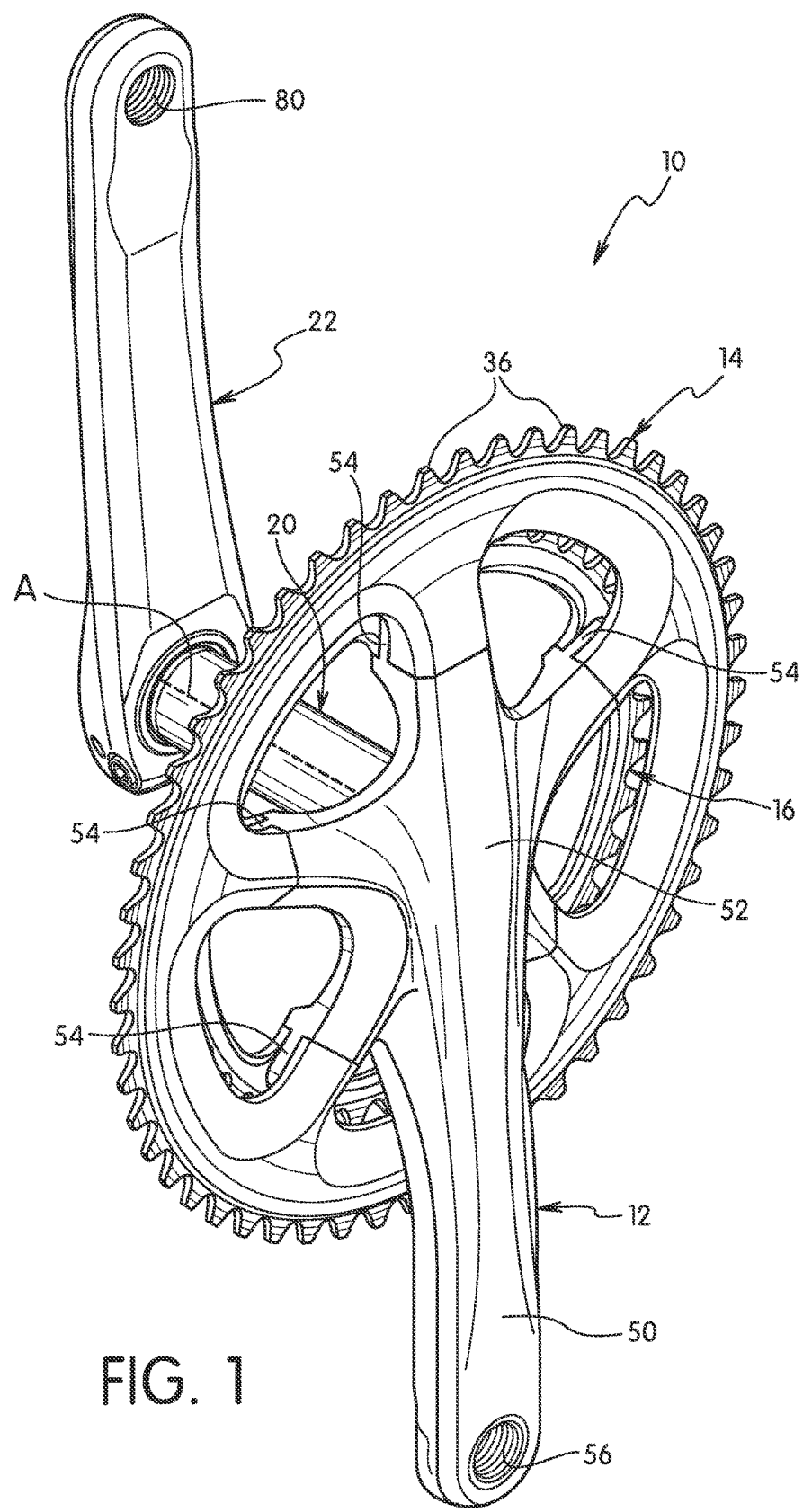
FIG. 1 is an assembled perspective view of a bicycle crank assembly in accordance with a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 to 6, a bicycle crank axle assembly 10 is illustrated in accordance with a first embodiment. The bicycle crank axle assembly 10 includes a right crank arm 12 having a first sprocket 14 and a second sprocket 16. The first and second sprockets 14 and 16 are fixedly secured to the right crank arm 12 in a releasable and reinstallable manner as explained below. The bicycle crank axle assembly 10 further includes a crank axle 20 and a left crank arm 22. The right crank min 12 is fixed to a first (right) end of the crank axle 20 in a conventional manner (e.g., crimping, locking ring, adhesive, etc.). The left crank arm 22 is fixed to a second (left) end of the crank axle 20 in a releasable and reinstallable manner (e.g., clamping or other suitable arrangement).

Figure 3:
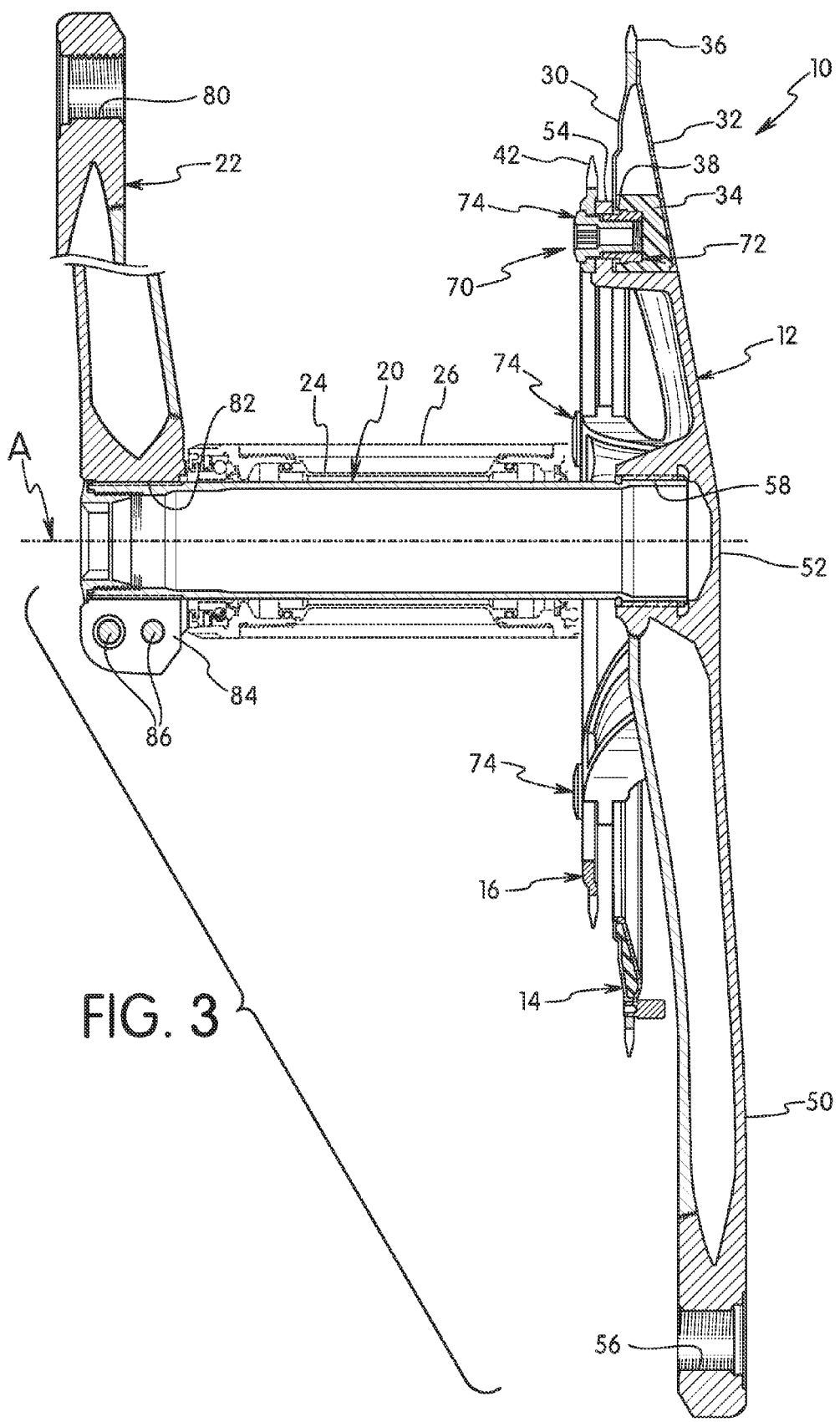
FIG. 3 is a transverse cross sectional view of the bicycle crank assembly illustrated in FIGS. 1 and 2.

As seen in FIG. 3, the bicycle crank axle assembly 10 is rotatably supported by a bottom bracket 24 in a hanger tube 26 for rotation about a center rotational axis A of the bottom bracket 24. The bottom bracket 24 is a conventional structure. Thus, the bottom bracket 24 will not be discussed or illustrated in detail herein. Rather, the following description will primarily focus on the attachment of the first and second sprockets 14 and 16 to the right crank arm 12.

First, the first and second sprockets 14 and 16 will be discussed in more detail. In the first illustrated embodiment, the second sprocket 16 is a solid metal chain ring, while the first sprocket 14 is a composite chain ring having an inner shell or cover 30, an outer shell or cover 32 and a filler part 34. The inner and outer shells 30 and 32 preferably made of a metallic material or any other suitable rigid material such as a fiber-reinforced resin, preferably a carbon fiber-reinforced resin. For example, the inner and outer shells 30 and 32 can be formed of a suitable metallic material such as a stainless steel, an aluminum alloy, a magnesium alloy, a titanium alloy, etc. The inner and outer shells 30 and 32 are fixedly coupled together by bonding (e.g., adhesive, welding, brazing, etc.) to define an interior space that is partly filled with the filler part 34 that is preferably made of a plastic resin material or any other suitable filler material. The filler part 34 can be considered a resin part when at least partial made of a resin material. The filler part 34 can include reinforcing fibers as needed and/or desired.

The first sprocket 14 includes a plurality of first teeth 36 and a plurality of first mounting portions 38 with each having a first mounting opening 40. The first teeth 36 are integrally formed with the inner shell 30 as a one-piece, unitary member. The first mounting portions 38 are mainly formed by the inner shell 30 and portions of the filler part 34 that surround the first mounting openings 40. In the first illustrated embodiment, the first sprocket 14 has five of the first mounting portions 38 with identical configurations, except that the shape of the exterior side of one of the first mounting portions 38 is contoured differently from the remaining four of the first mounting portions 38 such that the outer shell 32 flushly mates with the right crank arm 12. The structures of the inner shell 30 forming the first mounting portions 38 are identical. However, it will be apparent to those skilled in the art from this disclosure that each of the first mounting portions 38 can be substantially different from each other, and that the first sprocket 14 can have fewer or more of the first mounting portions 38, as needed and/or desired.

Figure 5:
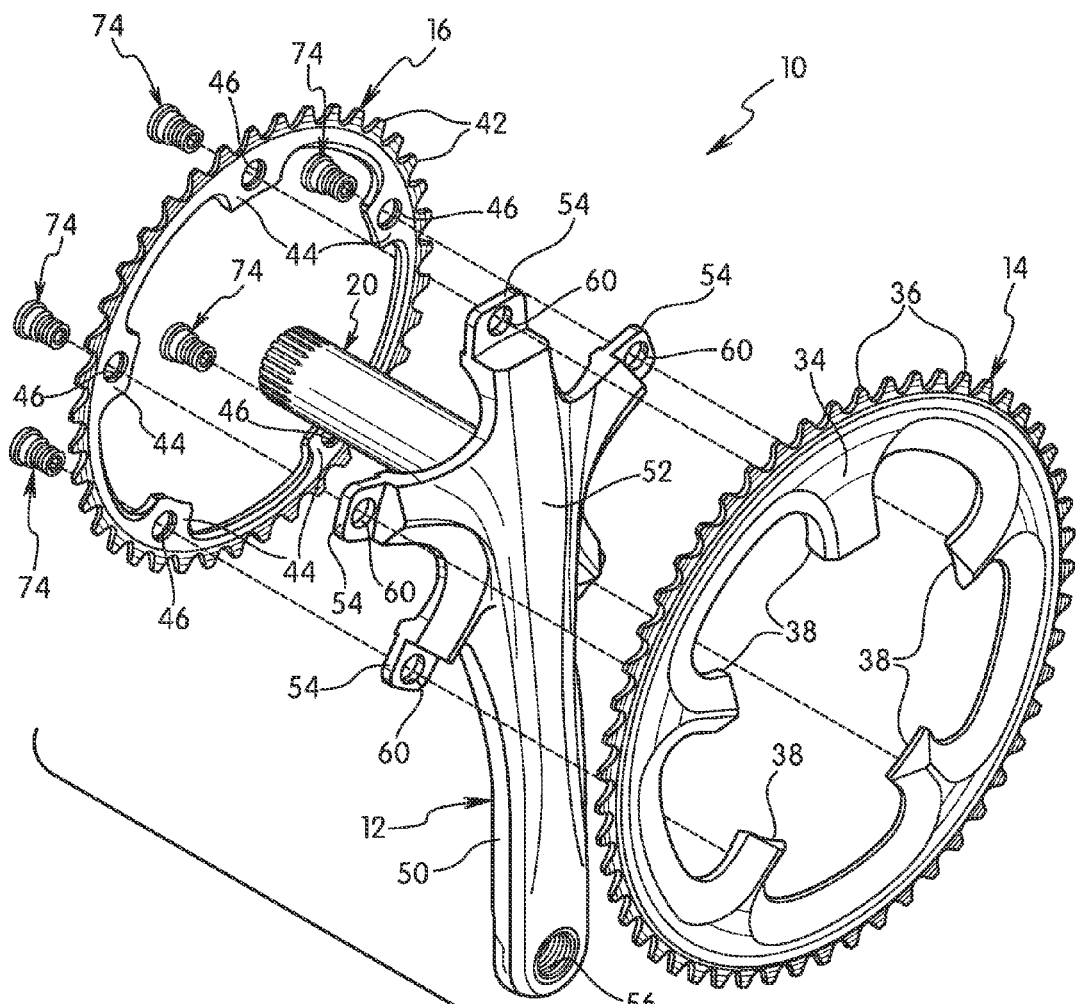
FIG. 5 is an exploded perspective view of the bicycle crank assembly illustrated in FIGS. 1 to 4.
Figure 6:
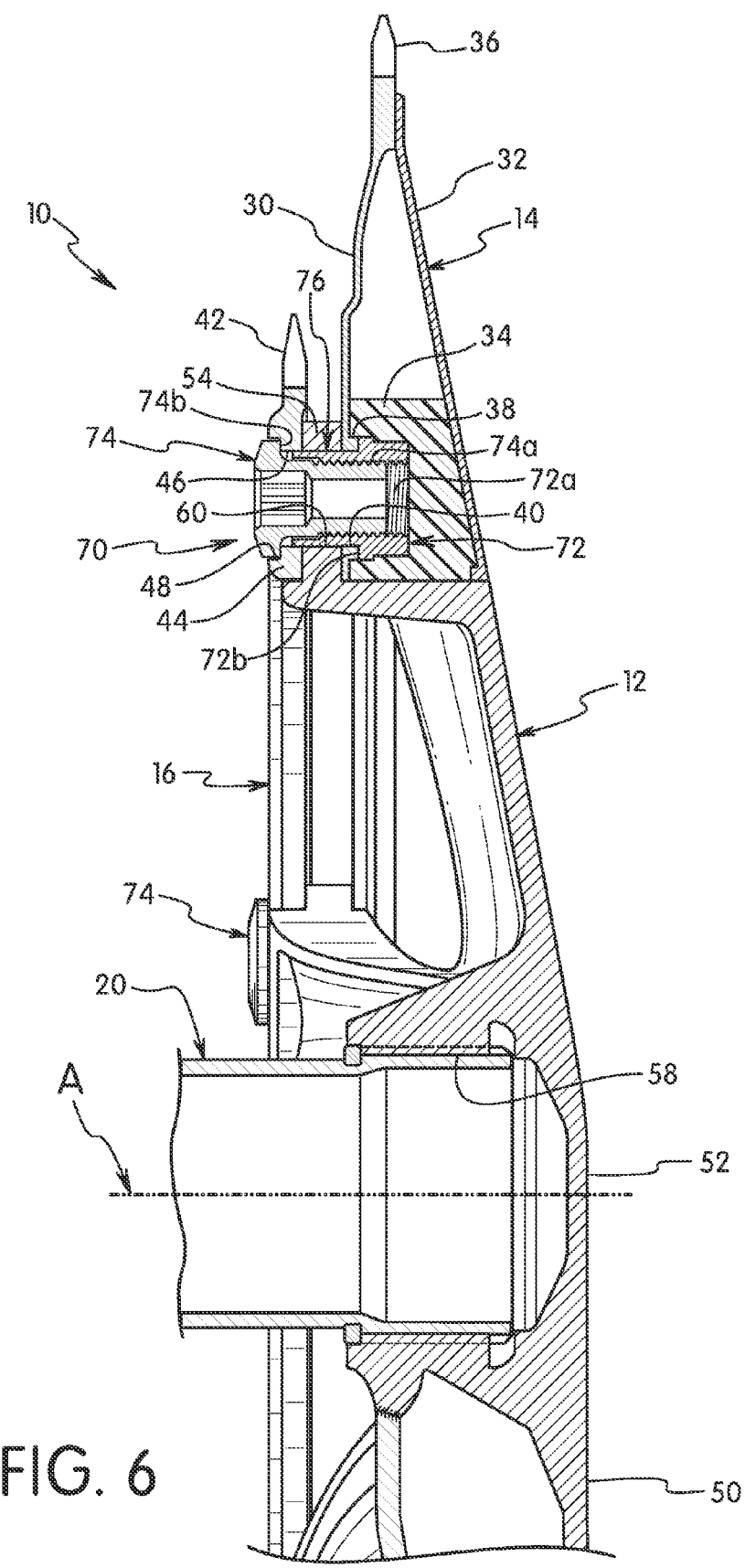
FIG. 6 is an enlarged transverse cross sectional view of one of the sprocket attachment portions of the bicycle crank axle assembly illustrated in FIGS. 1 to 5.

Similarly, as best seen in FIGS. 5 and 6, the second sprocket 16 includes a plurality of second teeth 42 and a plurality of second mounting portions 44 with each of the second mounting portions 44 having a second mounting opening 46. The second sprocket 16 has a recessed portion 48 (FIG. 6) around the second mounting opening 46. The second sprocket 16 is a one-piece, unitary member that is preferably formed of a suitable metallic material such as a stainless steel, an aluminum alloy, a magnesium alloy, a titanium alloy, etc. In the first illustrated embodiment, the second sprocket 16 has five of the second mounting portions 44 with identical configurations. However, it will be apparent to those skilled in the art from this disclosure that the second mounting portions 44 do not need to be identical, and that the second sprocket 16 can have fewer or more of the second mounting portions 44, as needed and/or desired.

Figure 4:
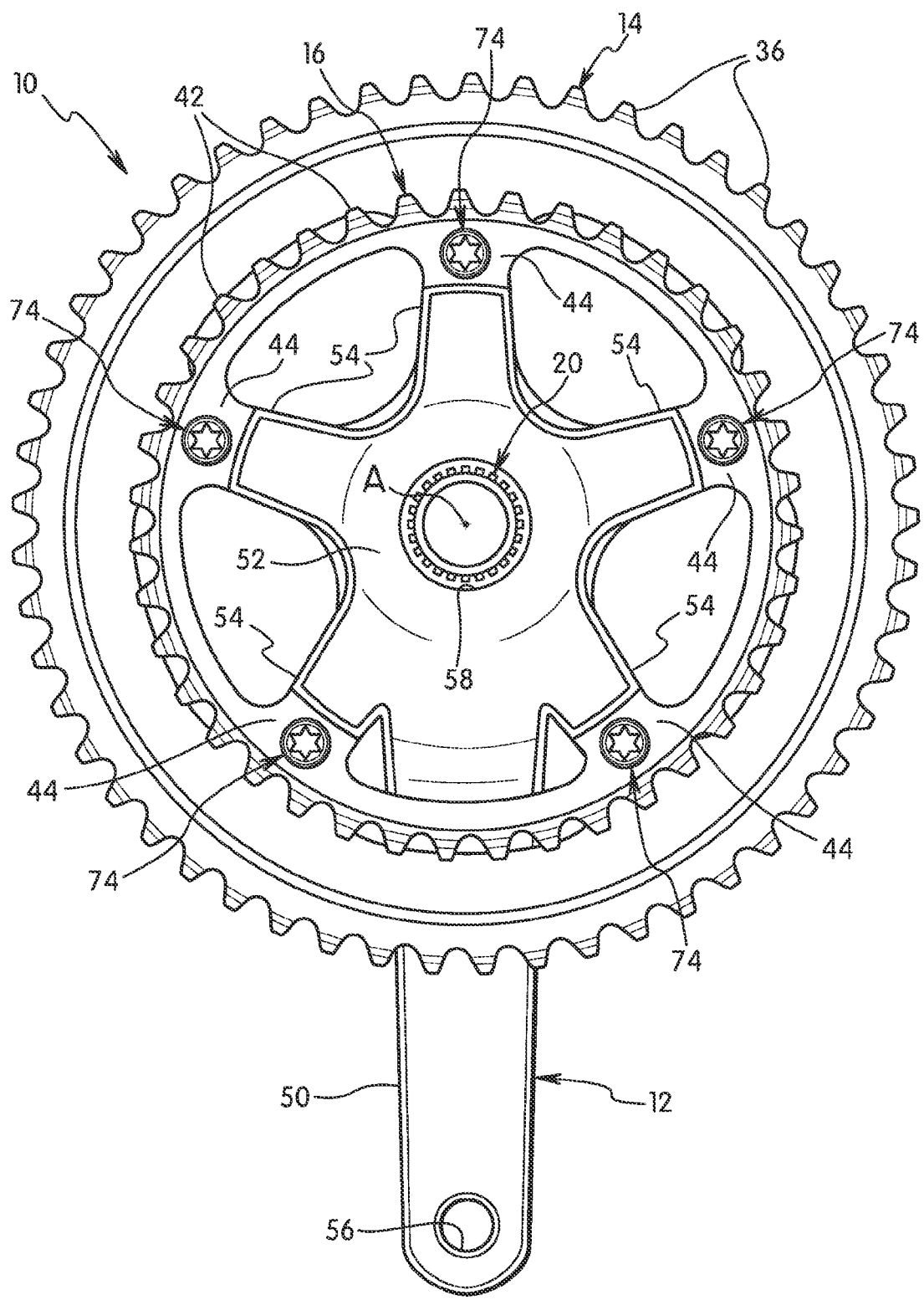
FIG. 4 is an inside elevational view of the bicycle crank assembly illustrated in FIGS. 1 to 3, but with the left crank arm removed.

Now, as seen in FIGS. 3 to 5, the right crank arm 12 will be discussed in more detail. The right crank arm 12 includes a gear crank portion 50, a crank axle attachment portion 52 and a plurality of sprocket attachment portions 54. The right crank arm 12 is illustrated as being formed with a two-piece construction from a light metal such as an aluminum alloy, a magnesium alloy, a titanium alloy, or other suitable light metal. In particular, a metallic cover member is fixedly attached (i.e., bonded) to a metallic body member that is a one-piece, unitary part. As a result, the gear crank portion 50 has an interior space to reduce the weight of the right crank arm 12. This interior space can be empty or filled with a resin material as needed and/or desired. However, the right crank arm 12 is not limited to this construction. The right crank arm 12 can be formed of a single piece or of several pieces of various materials.

As seen in FIGS. 3 and 5, the gear crank portion 50 has tip or free end portion with a pedal attachment hole 56 that is threaded for threadedly attaching a pedal (not shown). The crank axle attachment portion 52 has a crank axle attachment hole 58 that has a plurality of splines for engaging the crank axle 20 to prevent rotation therebetween as seen in FIG. 3. Alternatively, the right crank arm 12 may be designed to be removably fastened to the crank axle 20 as needed and/or desired. In the first illustrated embodiment, each of the sprocket attachment portions 54 has a third mounting opening 60 as best seen in FIG. 5. The crank axle attachment portion 52 and the sprocket attachment portions 54 form a substantially starfish-shaped member that functions as a spider arm for the gear crank portion 50.

In order to secure the first and second sprockets 14 and 16 to the right crank arm 12, the bicycle crank assembly 10 further includes a plurality of sprocket fixing structures 70. The sprocket fixing structure 70 secures the first and second sprockets 14 and 16 to the crank arm 12 via the first, second and third mounting openings 40, 46 and 60, respectively. In the first illustrated embodiment, each of the sprocket fixing structures 70 includes a fixing nut 72 having an internal thread 72a and a fixing bolt 74 having an external thread 74a. The external thread 74a of the fixing bolt 74 is threaded into the internal thread 72a of the fixing nut 72 to secure the first and second sprockets 14 and 16 to the right crank arm 12. The fixing nut 72 includes an abutment part 72b that contacts one of the first and second sprockets 14 and 16, while the fixing bolt 74 includes an abutment part 74b that contacts the other of the first and second sprockets 14 and 16. The abutment part 74b of the fixing bolt 74 is preferably disposed in the recessed portion 48 of the second sprocket 16 in the assembled state.

In the first illustrated embodiment, each of the fixing nuts 72 are embedded in the filler (resin) part 34 of the first sprocket 14 so that the fixing nuts 72 align with the first mounting openings 40. The fixing nuts 72 are preferably formed of a suitable metallic material such as a chrome molybdenum steel, an aluminum alloy, a magnesium alloy, a titanium alloy, etc. In order to accurately position the first and second sprockets 14 and 16 to the right crank arm 12, the bicycle crank assembly 10 further includes a plurality of alignment tubes 76. In the first illustrated embodiment, the alignment tubes 76 are integrally formed with the fixing nuts 72 and extend axially from the abutment part 72b. Thus, the alignment tubes 76 extend through corresponding ones of the first, second and third mounting openings 40, 46 and 60. The right crank arm 12 and the first and second sprockets 14 and 16 are aligned by the alignment tubes 76. Because the alignment tubes 76 are integrally formed with the fixing nuts 72, which are non-detachably, i.e. firmly, fixed to the first sprocket 14, it is possible to achieve accurate positioning of the first and second sprockets 14 and 16 and the right crank arm 12 even if the center axes of the fixing bolts 74 become inclined with respect to the center axes of the fixing nuts 72 during attachment of the first and second sprockets 14 and 16 to the right crank arm 12. The alignment tubes 76 are cylindrical with an outer diameter that is dimensioned to substantially match the inner diameters of the mounting openings 40, 46 and 60. However, the alignment tubes 76 are not limited to a cylindrical tube. The alignment tubes 76 can have other shapes that snugly engage the mounting openings 40, 46 and 60, which can be cylindrical bores or other suitable shapes. In any event, the alignment tubes 76 are dimensioned relative to the mounting openings 40, 46 and 60 such that the first and second sprockets 14 and 16 are accurately position relative to the right crank arm 12 and the center rotational axis A.

While in the first illustrated embodiment, each of the sprocket fixing structures 70 are identical with the alignment tubes 76 integrally formed with the fixing nuts 72, it will be apparent to those skilled in the art from this disclosure that each of the sprocket fixing structures 70 can have a different construction, if needed and/or desired. For example, only one of the sprocket fixing structures 70 can be configured with the alignment tube 76 integrally formed with the fixing nut 72 as seen in FIG. 6, while the remaining sprocket fixing structures 70 can be configured with conventional sprocket fixing structures. Alternatively, for example, some of the sprocket fixing structures 70 can have the configuration as seen in FIG. 6, while other sprocket fixing structures can be either conventional or constructed according to one of the later embodiments.

In the first illustrated embodiment, the crank axle 20 is a hollow pipe-shaped member that is highly rigid. For example, the crank axle 20 is made of a metallic material as chrome molybdenum steel. Preferably, the crank axle 20 defines a longitudinal axis that substantially coincides with the rotational center axis A of the bottom bracket 24. As shown in FIG. 3, the crank arms 12 and 22 are fixed to opposite end portions of the crank axle 20 and extend in opposite directions. The left crank arm 22 is removably fastened to a first or left end portion of the crank axle 20, while the right crank arm 12 is preferably fixed to a second or right end portion of the crank axle 20 so that the right crank arm 12 is integrally coupled to the crank axle 20 through a splined-connection. In particular, as shown in FIG. 3, a first or left end portion of the crank axle 20 includes a female or internal thread 20a and a plurality of external splines or serrations 20b.

Figure 2:
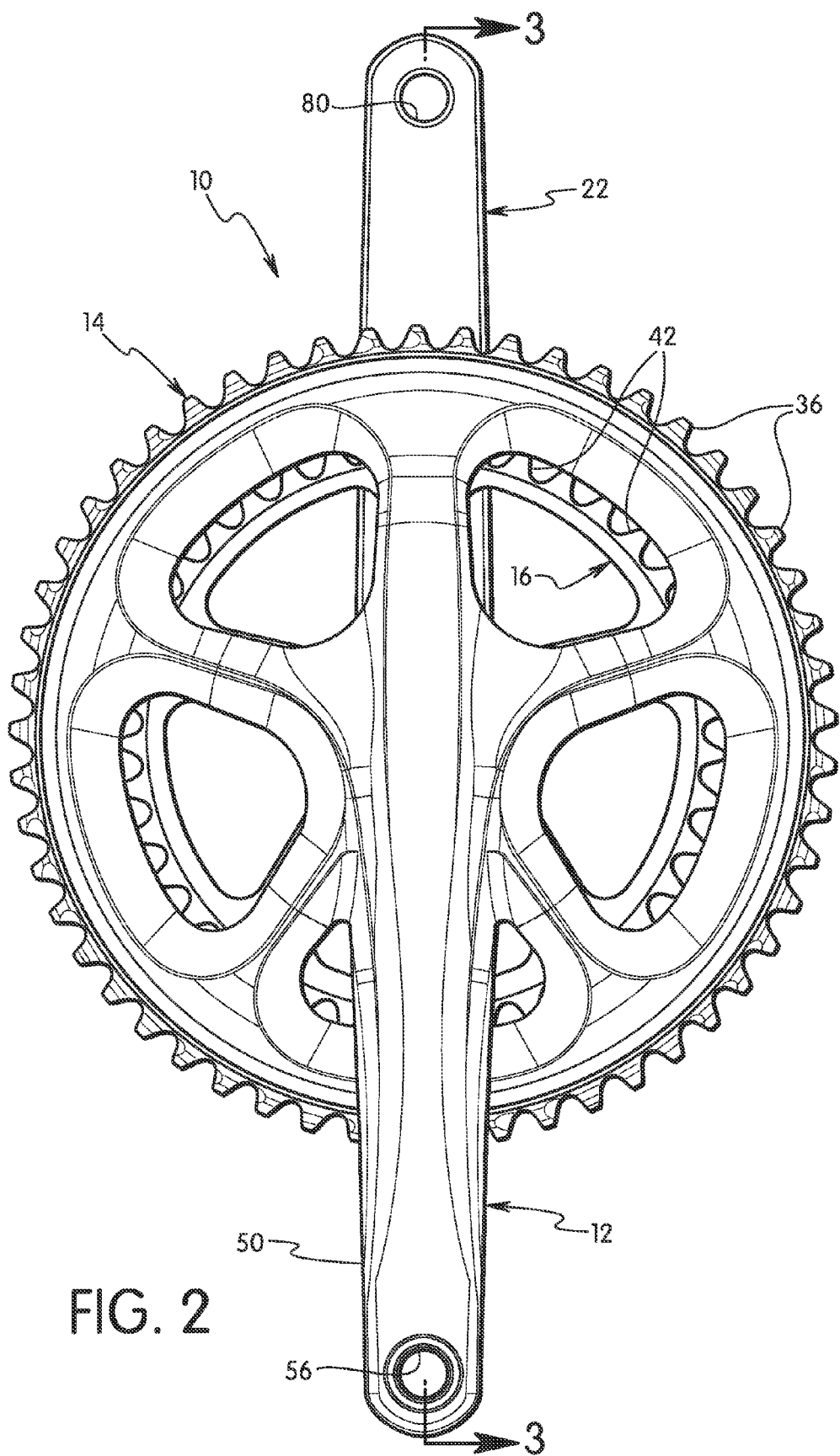
FIG. 2 is an outside elevational view of the bicycle crank assembly illustrated in FIG. 1.

As seen in FIGS. 1 to 3, the left crank arm 22 has a tip or free end portion with a pedal attachment hole 80 that is threaded for threadedly attaching a pedal (not shown). As seen in FIG. 3, the left crank arm 22 has a connecting hole 82 with a radial slit 84. The connecting hole 82 of the left crank arm 22 is mounted on the crank axle 20. The left crank arm 22 is strongly fixed on the crank axle 20 by tightening up two mounting bolts 86 that are located on the bottom of the crank axle 20 as seen in FIG. 3. Thus, the width of the slit 84 is narrowed by tightening the mounting bolts 86 that extend across the slit 84 to strongly fix the left crank arm 22 on the crank axle 20. These two mounting bolts 86 are, for example, hexagon socket head bolts, and their heads are preferably inserted from different directions with respect to the slit 84.

Figure 7:
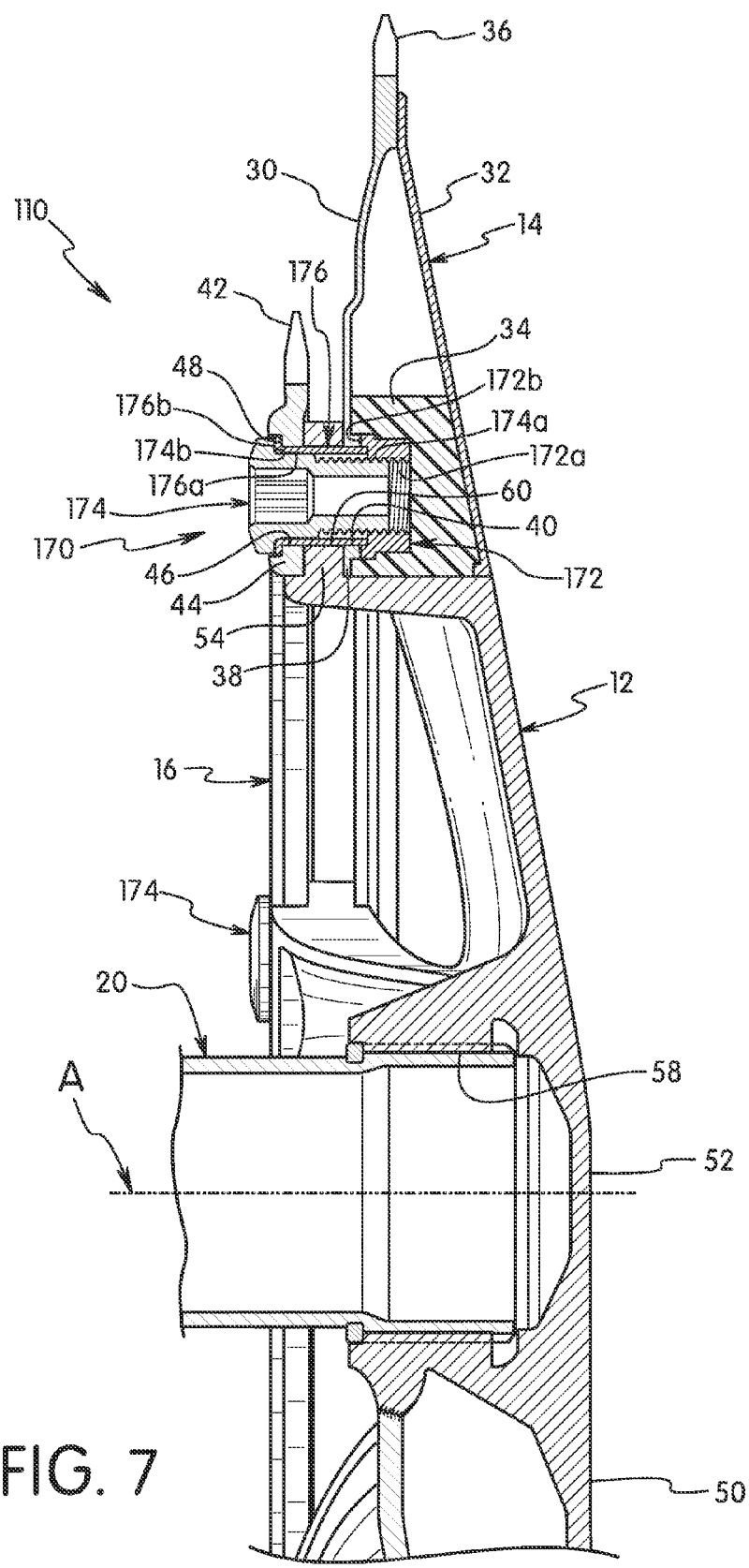
FIG. 7 is an enlarged transverse cross sectional view of a sprocket attachment portion of a bicycle crank axle assembly in accordance with a second embodiment.

Referring now to FIG. 7, a sprocket attachment portion of a bicycle crank axle assembly 110 will now be explained in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, the crank axle assembly 110 is provided with a plurality of sprocket fixing structures 170 (only one shown) for securing the first and second sprockets 14 and 16 to the right crank arm 12. Each of the fixing structures 170 includes a fixing nut 172 and a fixing bolt 174. However, a separate alignment tube 176 is provided for receiving each of the sprocket fixing structures 170. Thus, basically, the only difference between the first and second embodiments is that the alignment tubes 176 are not integrally formed with the fixing nut 172 in the crank axle assembly 110 of the second embodiment. In other words, each of the alignment tubes 176 is a bushing that extends through the first, second and third mounting openings 40, 46 and 60, respectively.

Similar to the first embodiment, the fixing nut 172 is embedded in the filler (resin) part 34 of the first sprocket 14. Also similar to the first embodiment, the fixing bolt 174 has an external thread 174a that threadedly engages an internal thread 172a of the fixing nut 172 to secure the first and second sprockets 14 and 16 to the right crank arm 12. The fixing nut 172 also includes an abutment part 172b that contacts the first sprocket 14, while the fixing bolt 174 includes an abutment part 174b that contacts the second sprocket 16. The abutment part 174b of the fixing bolt 174 is preferably disposed in the recessed portion 48 of the second sprocket 16 in the assembled state.

In the second embodiment, preferably, each of the alignment tubes or bushings 176 (only one shown) includes a tubular portion 176a and a flange portion 176b. The tubular portion 176a extends through the first, second and third mounting openings 40, 46 and 60, respectively. The flange portion 176b extends in a radial direction from the tubular portion 176a. The flange portion 176b is pinched between the second sprocket 14 and the abutment part 174b of the fixing bolt 174. In the second embodiment, the alignment tubes 176 are bushings that are separate members from the fixing nuts 172 and the fixing bolt 174. Therefore, even if the center axes of the fixing bolts 174 become inclined with respect to the center axes of the fixing nuts 172 during attachment of the first and second sprockets 14 and 16 to the right crank arm 12, such inclination of the fixing bolts 174 less affects positioning of the first and second sprockets 14 and 16 and the right crank arm 12.

Figure 8:
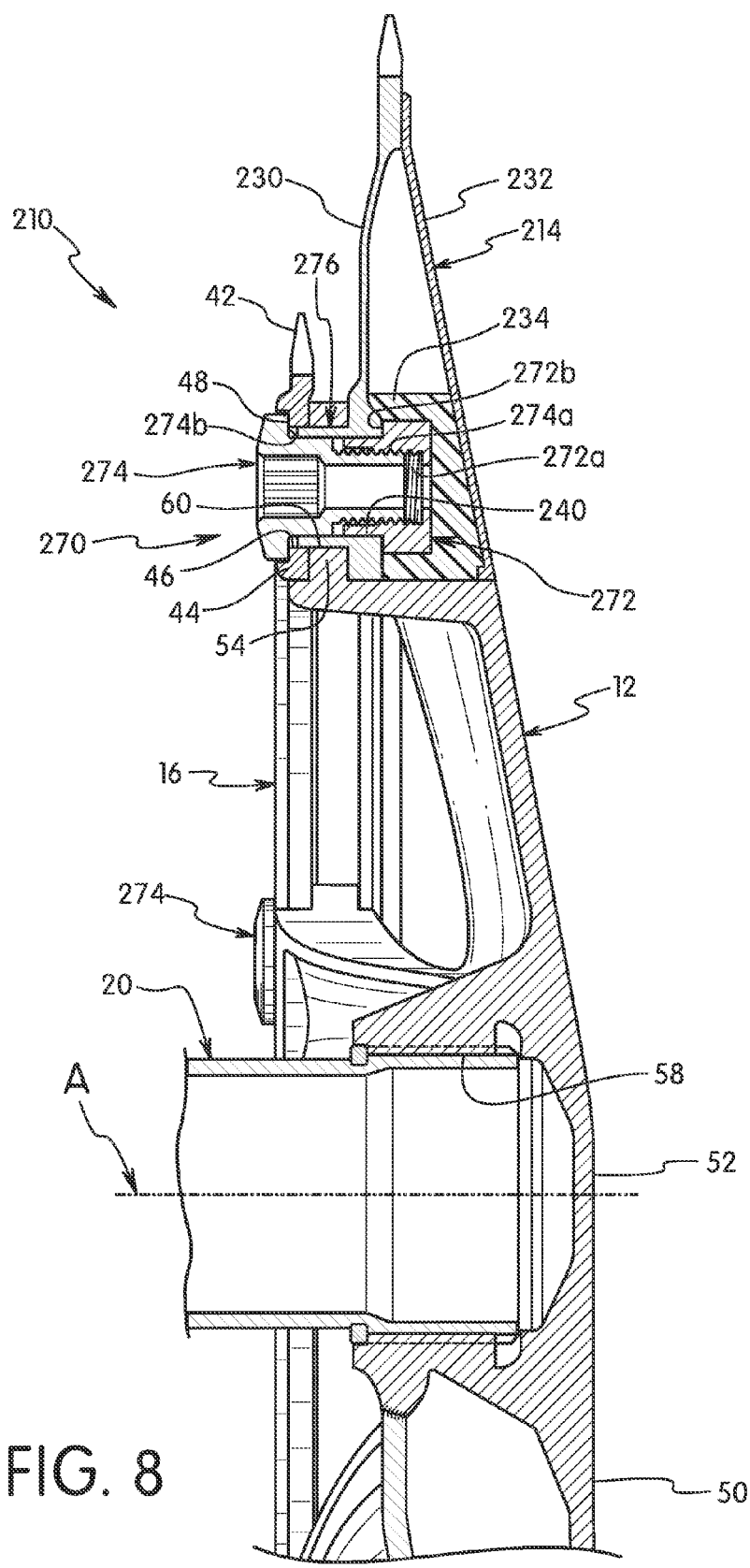
FIG. 8 is an enlarged transverse cross sectional view of a sprocket attachment portion of a bicycle crank axle assembly in accordance with a third embodiment.

Referring now to FIG. 8, a sprocket attachment portion of a bicycle crank axle assembly 210 will now be explained in accordance a third embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Here in this third embodiment, the crank axle assembly 210 is provided with a modified first sprocket 214 and a plurality of sprocket fixing structures 270 (only one shown) for securing the first and second sprockets 214 and 16 to the right crank arm 12. Each of the fixing structures 270 includes a fixing nut 272 and a fixing bolt 274. However, in this third embodiment, an alignment tube 276 is integrally formed with the first sprocket 214 at each of the first mounting openings 240 for receiving each of the sprocket fixing structures 270. The first sprocket 214 is identical to the first sprocket 14, discussed above, except that the alignment tubes 276 (only one shown) have been integrally formed with an inner shell 230 of the first sprocket 214 at each of the first mounting openings 240 as a one-piece, unitary member, and that the wall thickness of the inner shell 230 of the first sprocket 214 has been increased at each of the first mounting openings 240. In other words, each of the alignment tubes 276 only extends through the second and third mounting openings 46 and 60, respectively, in this third embodiment.

Similar to the first embodiment, the fixing nut 272 is embedded in a filler (resin) part 234 of the first sprocket 214. Also similar to the first embodiment, the fixing bolt 274 has an external thread 274a that threadedly engages an internal thread 272a of the fixing nut 272 to secure the first and second sprockets 214 and 16 to the right crank arm 12. The fixing nut 272 also includes an abutment part 272b that contacts the first sprocket 214, while the fixing bolt 274 includes an abutment part 274b that contacts the second sprocket 16. The abutment part 274b of the fixing bolt 274 is preferably disposed in the recessed portion 48 of the second sprocket 16 in the assembled state. Because the alignment tubes 276 are integrally formed with the first sprocket 214, it is possible to achieve accurate positioning of the first and second sprockets 214 and 16 and the right crank arm 12 even if the center axes of the fixing bolts 274 become inclined with respect to the center axes of the fixing nuts 272 during attachment of the first and second sprockets 214 and 16 to the right crank arm 12.

Figure 9:
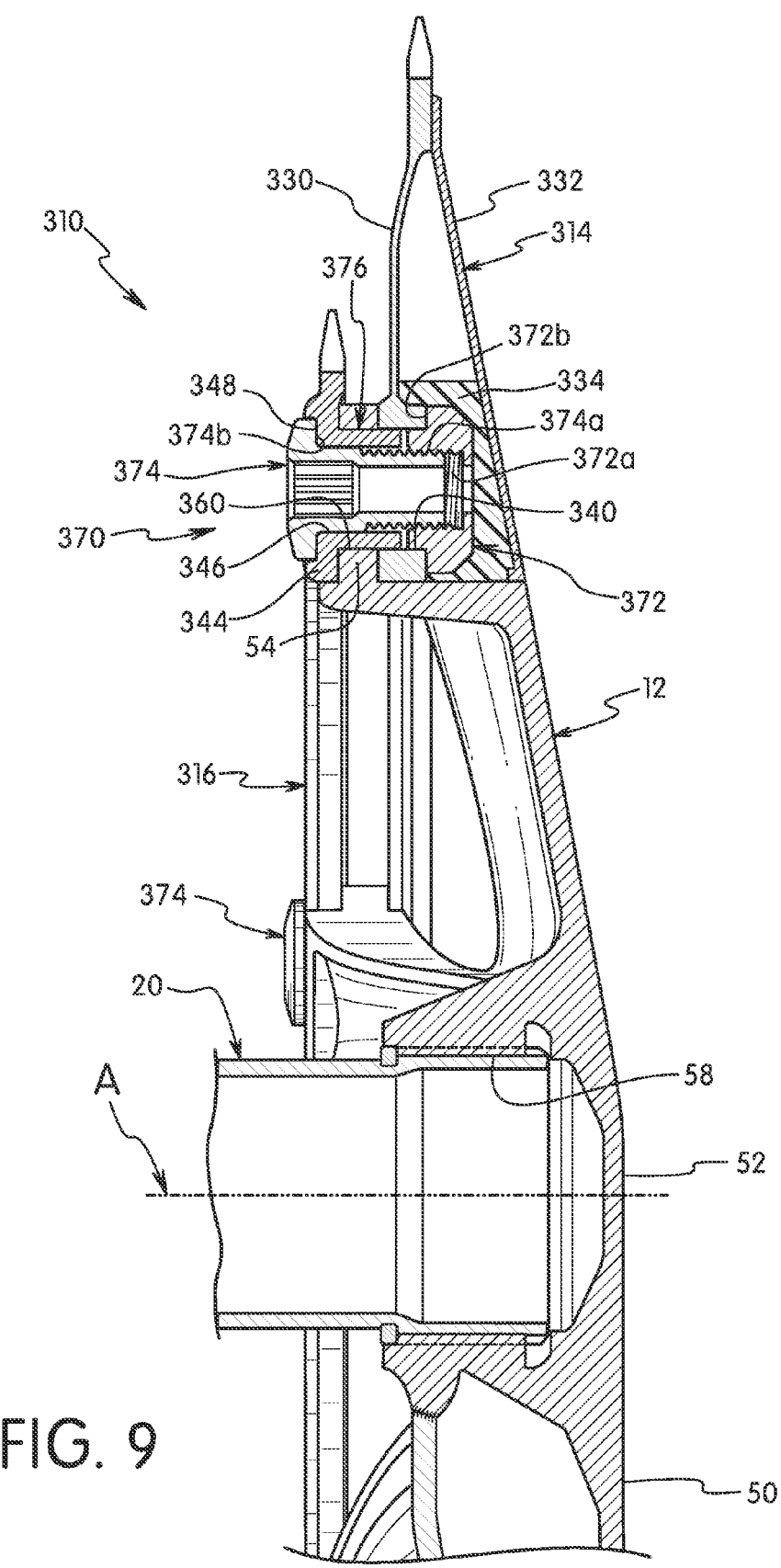
FIG. 9 is an enlarged transverse cross sectional view of a sprocket attachment portion of a bicycle crank axle assembly in accordance with a fourth embodiment.

Referring now to FIG. 9, a sprocket attachment portion of a bicycle crank axle assembly 310 will now be explained in accordance with a fourth embodiment. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Here in this fourth embodiment, the crank axle assembly 310 is provided with a modified first sprocket 314, a modified second sprocket 316 and a plurality of sprocket fixing structures 370 (only one shown) for securing the first and second sprockets 314 and 316 to the right crank arm 12. Each of the fixing structures 370 includes a fixing nut 372 and a fixing bolt 374. However, in this fourth embodiment, an alignment tube 376 is integrally formed with the second sprocket 316 at each of the second mounting openings 346 for receiving each of the sprocket fixing structures 370. The first sprocket 314 is identical to the first sprocket 14, discussed above, except that the wall thickness of an inner shell 330 of the first sprocket 314 has been increased at each of the first mounting openings 340. The second sprocket 316 is identical to the second sprocket 16, discussed above, except that the alignment tubes 376 have been integrally formed with the second sprocket 316 as a one-piece, unitary member. In other words, each of the alignment tubes 376 only extends through the first and third mounting openings 340 and 360, respectively, in this fourth embodiment.

Similar to the first embodiment, the fixing nut 372 is embedded in a filler (resin) part 334 of the first sprocket 314. Also similar to the first embodiment, the fixing bolt 374 has an external thread 374a that threadedly engages an internal thread 372a of the fixing nut 372 to secure the first and second sprockets 314 and 316 to the right crank arm 12. The fixing nut 372 also includes an abutment part 372b that contacts the first sprocket 314, while the fixing bolt 374 includes an abutment part 374b that contacts the second sprocket 316. The abutment part 374b of the fixing bolt 374 is preferably disposed in a recessed portion 348 of the sprocket mounting portion 344 of the second sprocket 316 in the assembled state. Because the alignment tubes 376 are integrally formed with the second sprocket 316, it is possible to achieve accurate positioning of the first and second sprockets 314 and 316 and the right crank arm 12 even if the center axes of the fixing bolts 374 become inclined with respect to the center axes of the fixing nuts 372 during attachment of the first and second sprockets 314 and 316 to the right crank arm 12.

Figure 10:
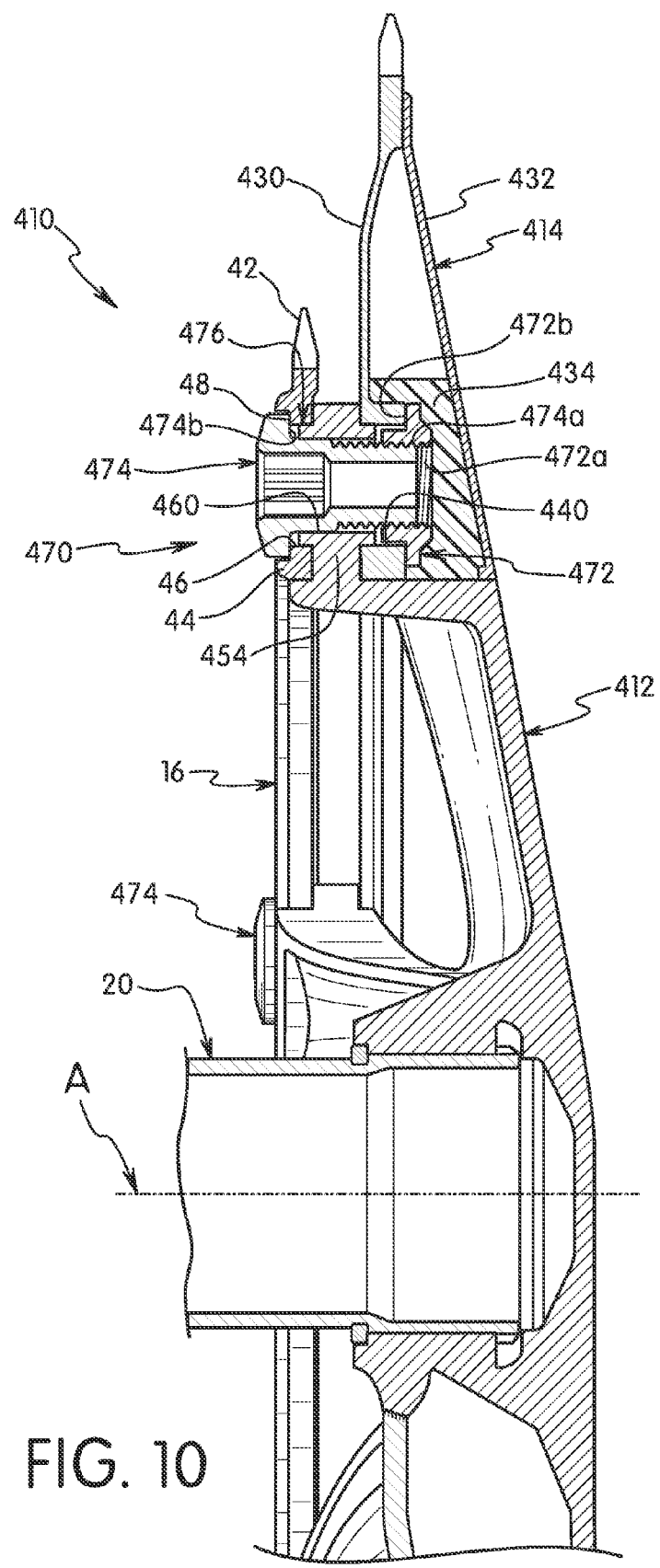
FIG. 10 is an enlarged transverse cross sectional view of a sprocket attachment portion of a bicycle crank axle assembly in accordance with a fifth embodiment.

Referring now to FIG. 10, a sprocket attachment portion of a bicycle crank axle assembly 410 will now be explained in accordance a fifth embodiment. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Here in this fifth embodiment, the crank axle assembly 410 is provided with a modified right crank arm 412, a modified first sprocket 414, and a plurality of sprocket fixing structures 470 (only one shown) for securing the first and second sprockets 414 and 16 to the right crank arm 412. Each of the fixing structures 470 includes a fixing nut 472 and a fixing bolt 474. However, in this fifth embodiment, an alignment tube 476 is integrally formed with the crank arm 412 on each sprocket attachment portion 454 at each of the third mounting openings 460 for receiving each of the sprocket fixing structures 470. The first sprocket 414 is identical to the first sprocket 14, discussed above, except that the wall thickness of an inner shell 430 of the first sprocket 414 has been increased at each of the first mounting openings 440. The right crank arm 412 is identical to the right crank arm 12, discussed above, except that the alignment tubes 476 (only one shown) are integrally formed with the crank arm 412 at each of the third mounting openings 460. The alignment tubes 476 extend in opposite axial directions with respect to the center axes of the third mounting openings 460 from the sprocket attachment portions 454 (only one shown). In other words, each of the alignment tubes 476 only extends through the first and second mounting openings 440 and 46, respectively, in this fifth embodiment.

Similar to the first embodiment, the fixing nut 472 is embedded in a filler (resin) part 434 of the first sprocket 414. Also similar to the first embodiment, the fixing bolt 474 has an external thread 474a that threadedly engages an internal thread 472a of the fixing nut 472 to secure the first and second sprockets 414 and 16 to the right crank arm 412. The fixing nut 472 also includes an abutment part 472b that contacts the first sprocket 414, while the fixing bolt 474 includes an abutment part 474b that contacts the second sprocket 16. The abutment part 474b of the fixing bolt 474 is preferably disposed in the recessed portion 48 of the second sprocket 16 in the assembled state. Because the alignment tubes 476 are integrally formed with the crank arm 412, it is possible to achieve accurate positioning of the first and second sprockets 414 and 16 and the crank arm 412 even if the center axes of the fixing bolts 474 become inclined with respect to the center axes of the fixing nuts 472 during attachment of the first and second sprockets 414 and 16 to the right crank arm 412.

Figure 11:
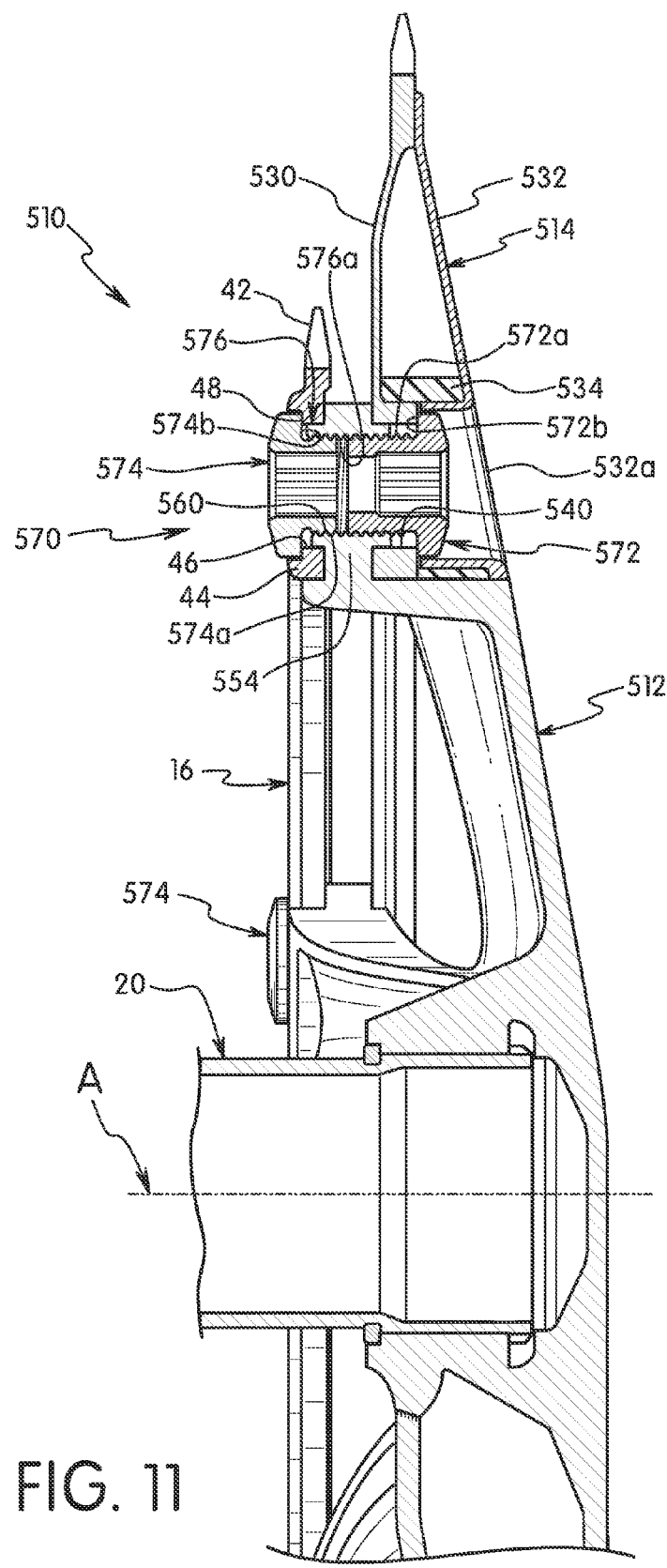
FIG. 11 is an enlarged transverse cross sectional view of a sprocket attachment portion of a bicycle crank axle assembly in accordance with a sixth embodiment.

Referring now to FIG. 11, a sprocket attachment portion of a bicycle crank axle assembly 510 will now be explained in accordance with a sixth embodiment. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

Here in this sixth embodiment, the crank axle assembly 510 is provided with a modified right crank arm 512, a modified first sprocket 514, and a plurality of sprocket fixing structures 570 (only one shown) for securing the first and second sprockets 514 and 16 to the right crank arm 512. In this sixth embodiment, each of the fixing structures 570 includes a first fixing bolt 572 with an external thread 572a and a second fixing bolt 574 with an external thread 574a. Thus, the fixing nut of the prior embodiments has been replaced with the first fixing bolt 572 in this sixth embodiment. Also, in this sixth embodiment, an alignment tube 576 is integrally formed with the crank arm 512 on each sprocket attachment portion 554 at each of the third mounting openings 560 for receiving each of the sprocket fixing structures 570. Each of the alignment tubes 576 (only one shown) of the crank arm 512 has an internal thread 576a formed along the third mounting openings 560 so that the external threads 572a and 574a of the first and second fixing bolts 572 and 574 are threaded into the internal thread 576a of the alignment tubes 576 of the crank arm 512.

The first sprocket 514 is identical to the first sprocket 14, discussed above, except that the wall thickness of an inner shell 530 of the first sprocket 514 has been increased at each of the first mounting openings 540 and an outer shell 532 of the first sprocket 514 has been provided with an opening 532a at each of the sprocket fixing structures 570 for accessing the in the first fixing bolts 572. The right crank arm 512 is identical to the right crank arm 12, discussed above, except that the alignment tubes 576 (only one shown) are integrally formed with the crank arm 512 at each of the third mounting openings 560 and the alignment tubes 576 (only one shown) are each provided with the internal thread 576a. The alignment tubes 576 extend in opposite axial directions with respect to the center axes of the third mounting openings 560 from the sprocket attachment portions 554 (only one shown) of the crank arm 512. In other words, each of the alignment tubes 576 only extends through the first and second mounting openings 540 and 46, respectively, in this sixth embodiment.

In this sixth embodiment, each of the first fixing bolts 572 also includes an abutment part 572b that contacts the first sprocket 514, while each of the second fixing bolts 574 includes an abutment part 574b that contacts the second sprocket 16. The abutment part 574b of the fixing bolt 574 is preferably disposed in the recessed portion 48 of the second sprocket 16 in the assembled state. Because the alignment tubes 576 are integrally formed with the crank arm 512, it is possible to achieve accurate positioning of the first and second sprockets 514 and 16 and the crank arm 512 even if the center axes of the first and second fixing bolts 572 and 574 become inclined with respect to the center axes of the internal threads 576a during attachment of the first and second sprockets 514 and 16 to the crank arm 512.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle crank assembly. Accordingly, these terms, as utilized to describe the bicycle crank assembly should be interpreted relative to a bicycle equipped with the bicycle crank assembly as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
    a first sprocket including a plurality of first teeth and at least one first mounting portion having a first mounting opening;
    a second sprocket including a plurality of second teeth and at least one second mounting portion having a second mounting opening;
    a crank arm including at least one sprocket attachment portion having a third mounting opening;
    a sprocket fixing structure securing the first and second sprockets to the crank arm via the first, second and third mounting openings, the sprocket fixing structure including a fixing nut embedded in a resin part of the first sprocket, the fixing nut having an internal thread and a fixing bolt having an external thread, the external thread of the fixing bolt being threaded into the internal thread of the fixing nut; and
    an alignment tube extending through at least two of the first, second and third mounting openings, the alignment tube being non-detachably maintained in a fixed relationship with one of the first sprocket, the second sprocket and the crank arm.

2. The bicycle crank assembly according to claim 1, wherein
    the alignment tube is a bushing that is a separate member from the sprocket fixing structure, and
    the bushing extends through the first, second and third mounting openings.

3. The bicycle crank assembly according to claim 2, wherein
    the bushing includes a tubular portion that extends through the first, second and third mounting openings and a flange portion that extends in a radial direction from the tubular portion, the flange portion being pinched between one of the first and second sprockets and one of the fixing bolt and the fixing nut.

4. The bicycle crank assembly according to claim 1, wherein the alignment tube is integrally formed with the first sprocket and extends through the second and third mounting openings.

5. The bicycle crank assembly according to claim 1, wherein
the alignment tube is integrally formed with the second sprocket and extends through the first and third mounting openings.

6. The bicycle crank assembly according to claim 5, wherein
the fixing nut includes an abutment part first and second sprockets and the fixing bolt includes an abutment part that contacts the other of the first and second sprockets.

7. The bicycle crank assembly according to claim 1, wherein
the alignment tube is integrally formed with the crank arm and extends through the first and second mounting openings.

8. The bicycle crank assembly according to claim 7, wherein
the fixing nut includes an abutment part that contacts one of the first and second sprockets and the fixing bolt includes an abutment part that contacts the other of the first and second sprockets.

9. The bicycle crank assembly according to claim 1, wherein
the fixing nut includes an abutment part that contacts one of the first and second sprockets and the fixing bolt includes an abutment part that contacts the other of the first and second sprockets.

10. The bicycle crank assembly according to claim 9, wherein
at least one of the first and second sprockets has a recessed portion around at least one of the first and second mounting openings so that the abutment part of one of the fixing bolt and the fixing nut is disposed in the recessed portion upon assembled state.

11. The bicycle crank assembly according to claim 1, wherein
the resin part includes reinforcing fibers.

12. A bicycle crank assembly comprising:
a first sprocket including a plurality of first teeth and at least one first mounting portion having a first mounting opening:
a second sprocket including a plurality of second teeth and at least one second mounting portion having a second mounting opening;
a crank arm including at least one sprocket attachment portion having a third mounting opening;
a sprocket fixing structure securing the first and second sprockets to the crank arm via the first, second and third mounting openings, the sprocket fixing structure including a fixing nut embedded in a resin part of the first sprocket, the fixing nut having an internal thread and a fixing bolt having an external thread, the external thread of the fixing bolt being threaded into the internal thread of the fixing nut; and
an alignment tube extending through at least two of the first, second and third mounting openings, the alignment tube being non-detachably maintained in a fixed relationship with one of the first sprocket, the second sprocket and the crank arm, and
the alignment tube being integrally formed with the fixing nut and extending through the first, second and third mounting openings.

13. The bicycle crank assembly according to claim 12, wherein
one of the first and second sprockets includes an inner shell and an outer shell, and the resin part is disposed between the inner shell and the outer shell.

14. A bicycle crank assembly comprising:
a first sprocket including a plurality of first teeth and at least one first mounting portion having a first mounting opening:
a second sprocket including a plurality of second teeth and at least one second mounting portion having a second mounting opening;
a crank arm including at least one sprocket attachment portion having a third mounting opening;
a sprocket fixing structure securing the first and second sprockets to the crank arm via the first, second and third mounting openings, the sprocket fixing structure including a fixing nut having an internal thread and a fixing bolt having an external thread, the external thread of the fixing bolt being threaded into the internal thread of the fixing nut, the fixing nut having a thread that is only accessible from a bicycle frame facing side of the crank assembly such that the fixing bolt is installed from the bicycle frame facing side of the crank assembly; and
an alignment tube extending through at least two of the first, second and third mounting openings, the alignment tube being non-detachably maintained in a fixed relationship with one of the first sprocket, the second sprocket and the crank arm.

\* \* \* \* \*